(12) United States Patent
Kihara

(10) Patent No.: US 7,791,531 B2
(45) Date of Patent: Sep. 7, 2010

(54) VOR MONITORING RECEIVING APPARATUS AND VOR MONITOR RECEIVING METHOD

(75) Inventor: Hiroki Kihara, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 207 days.

(21) Appl. No.: 12/019,199

(22) Filed: Jan. 24, 2008

(65) Prior Publication Data

US 2009/0121919 A1    May 14, 2009

(30) Foreign Application Priority Data

Jan. 26, 2007    (JP) ............................ 2007-016632

(51) Int. Cl.
*G01S 13/00* (2006.01)
*G01S 7/40* (2006.01)

(52) U.S. Cl. ........................ 342/173; 342/33; 342/36; 342/165; 342/174

(58) Field of Classification Search ............. 342/33–40, 342/165, 173
See application file for complete search history.

(56) References Cited

U.S. PATENT DOCUMENTS

| 3,818,476 | A | * | 6/1974 | Coulter et al. | 342/360 |
| 4,333,081 | A | * | 6/1982 | Hofgen | 342/407 |
| 4,506,332 | A | * | 3/1985 | Bloch et al. | 702/57 |
| 4,739,351 | A | * | 4/1988 | Feldman | 342/169 |
| 5,130,716 | A | * | 7/1992 | Kleiber | 342/173 |
| 5,790,438 | A | * | 8/1998 | Simonnet | 702/122 |
| 6,437,739 | B1 | * | 8/2002 | Schulte et al. | 342/401 |
| 2009/0121919 | A1 | * | 5/2009 | Kihara | 342/173 |

FOREIGN PATENT DOCUMENTS

| EP | 0 429 972 A2 | 6/1991 |
| GB | 2 150 781 A | 7/1985 |
| JP | 5-204584 | 8/1993 |

* cited by examiner

*Primary Examiner*—Thomas H Tarcza
*Assistant Examiner*—Peter M Bythrow
(74) *Attorney, Agent, or Firm*—Oblon, Spivak, McClelland, Maier & Neustadt, L.L.P.

(57) ABSTRACT

A VOR monitoring receiving apparatus includes a receiving circuit for receiving a field signal from a VOR apparatus, and outputting content of the field signal to a plurality of signal systems, first and second monitoring receiving circuits provided in first and second signal systems included in the plurality of signal systems, respectively, for monitoring the content of the field signal, a self-check signal generator for generating a self-check signal necessary to confirm whether the first and second monitoring receiving circuits normally operate, a VOR monitoring controller for detecting an abnormality of the VOR apparatus based on monitoring results of the first and second monitoring receiving circuits, a switch for performing switching to alternately output the field signal and the self-check signal to the first and second signal systems, and a switch controller for controlling the switch to perform switching whenever a preset time elapses.

4 Claims, 3 Drawing Sheets

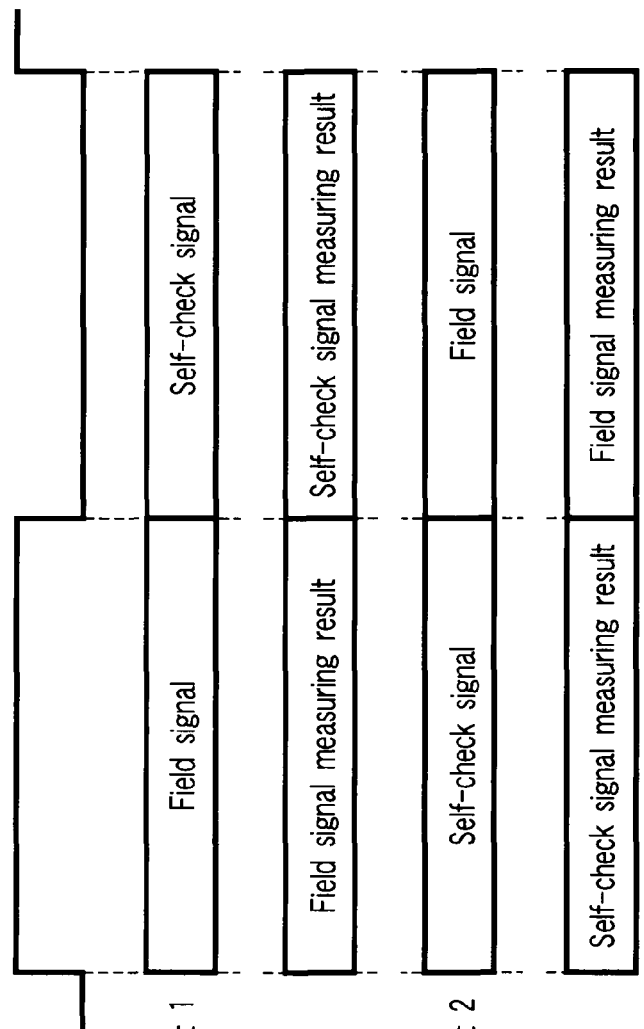

VOR MONITORING RECEIVING APPARATUS AND VOR MONITOR RECEIVING METHOD

CROSS-REFERENCE TO RELATED APPLICATIONS

This application is based upon and claims the benefit of priority from prior Japanese Patent Application No. 2007-016632, filed Jan. 26, 2007, the entire contents of which are incorporated herein by reference.

BACKGROUND OF THE INVENTION

1. Field of the Invention

The present invention relates to a VOR monitoring receiving apparatus and VOR monitor receiving method for monitoring the operation of a very high frequency omnidirectional radio range (VOR) apparatus.

2. Description of the Related Art

Airports in various regions employ various types of equipment for assisting the landing of airplanes, such as passenger airplanes. For instance, a very high frequency omnidirectional radio range (VOR) device is included in the equipment (see, for example, radar technologies disclosed by Institute of Electronics, Information and Communication Engineers). VOR apparatuses provide direction information to airplanes utilizing the horizontal polarization of a signal with a frequency of 112 to 118 MHz.

To utilize the VOR apparatuses, they are required to operate stably. In the prior art, a VOR monitoring receiving apparatus is used, which receives a field signal from a VOR apparatus and monitors it to confirm the operation of the VOR apparatus. To confirm whether a built-in monitoring receiving circuit is operating normally, the VOR monitoring receiving apparatus uses a self-check signal.

While the built-in monitoring receiving circuit is receiving a self-check signal, the VOR monitoring receiving device cannot receive a to-be-monitored field signal, and hence cannot detect any abnormality. In light of this, a technique of displaying, on a single screen, a window for a field signal and a window for a self-check signal may be employed as in standard computers (see, for example, Jpn. Pat. Appln. KOKAI Publication No. 5-204584). In this case, however, the control of a memory for holding the windows, and the window task control and structure are inevitably complex.

BRIEF SUMMARY OF THE INVENTION

It is an object of the invention to provide a VOR monitoring receiving apparatus capable of both self-checking a monitoring receiving circuit and monitoring a field signal, and a VOR monitor receiving method for enabling the apparatus to execute them.

In accordance with one aspect of the invention, there is provided a VOR monitoring receiving apparatus comprising: a receiving circuit configured to receive a field signal from a VOR apparatus, and output content of the field signal to a plurality of signal systems; a first monitoring receiving circuit provided in a first signal system included in the plurality of signal systems, and configured to monitor the content of the field signal; a second monitoring receiving circuit provided in a second signal system included in the plurality of signal systems, and configured to monitor the content of the field signal; a self-check signal generator configured to generate a self-check signal necessary to confirm whether the first and second monitoring receiving circuits normally operate; a VOR monitoring controller configured to detect an abnormality of the VOR apparatus based on monitoring results of the first and second monitoring receiving circuits; a switch configured to perform switching to alternately output the field signal and the self-check signal to the first and second signal systems; and a switch controller configured to control the switch to perform switching whenever a preset time elapses.

In accordance with another aspect of the invention, there is provided a VOR monitoring receiving method for receiving a field signal from a VOR apparatus, monitoring content of the field signal using at least one signal system included in the plurality of signal systems, and inputting a monitoring result to a VOR monitoring controller to detect an abnormality of the VOR apparatus, comprising: generating a self-check signal necessary to confirm whether a first monitoring receiving circuit and a second monitoring receiving circuit normally operate, which are provided in a first signal system and a second signal system included in the plurality of signal systems, respectively; alternately outputting the field signal and the self-check signal to the first and second signal systems whenever a preset time elapses; causing the first and second monitoring receiving circuits to perform monitoring and output monitoring results to the VOR monitoring controller.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3A is a view of signal timing useful in explaining the signal input operation of a first monitoring receiving circuit employed in the embodiment;

FIG. 3B is a view of signal timing useful in explaining the signal output operation of the first monitoring receiving circuit employed in the embodiment;

FIG. 3C is a view of signal timing useful in explaining the signal input operation of a second monitoring receiving circuit employed in the embodiment; and FIG. 3D is a view of signal timing useful in explaining the signal output operation of the second monitoring receiving circuit employed in the embodiment.

DETAILED DESCRIPTION OF THE INVENTION

An embodiment of the invention will be described in detail with reference to the accompanying drawings.

Figure 1:
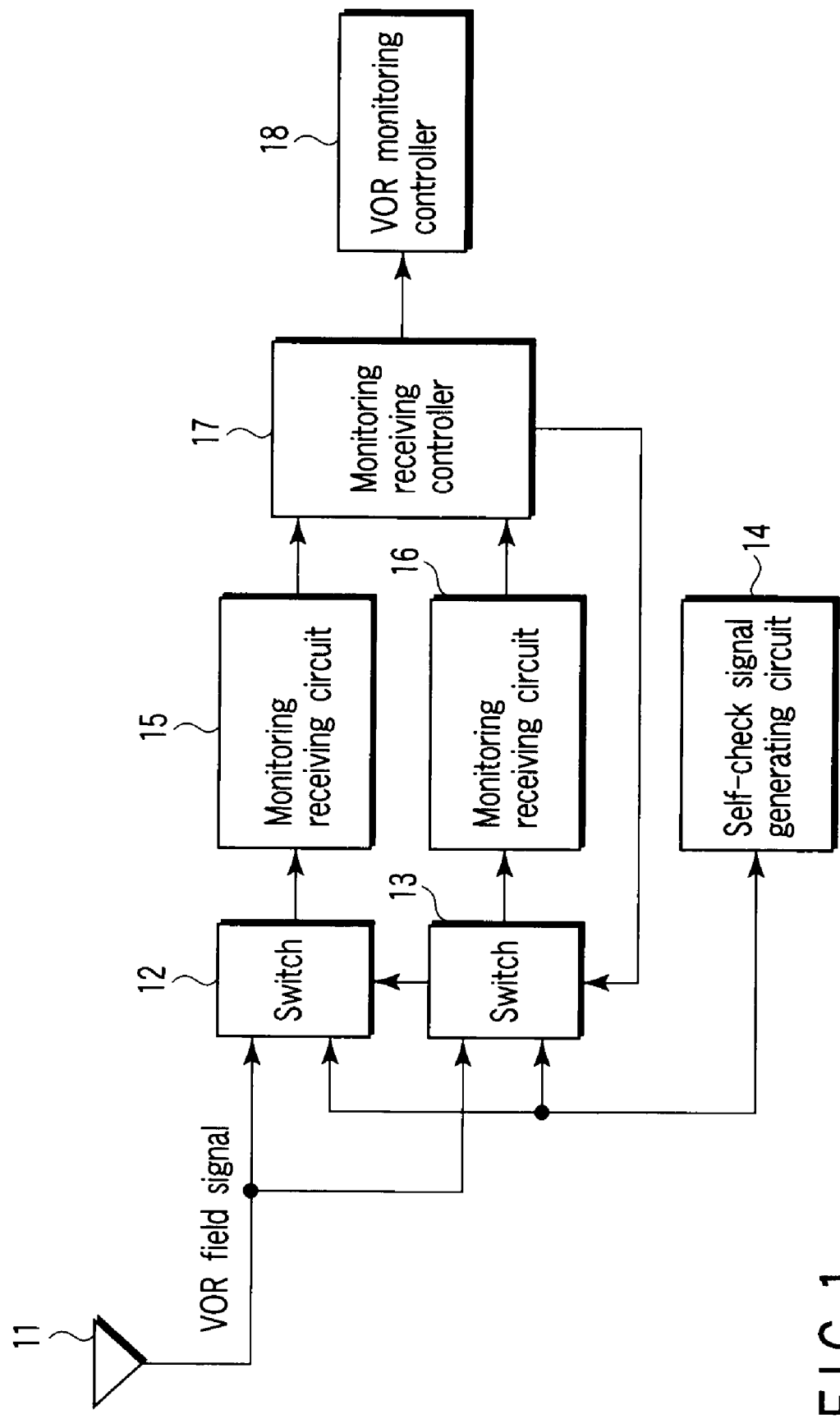
FIG. 1 is a block diagram illustrating the configuration of a VOR monitoring receiving apparatus according to an embodiment of the invention.

FIG. 1 is a block diagram illustrating the configuration of a VOR monitoring receiving apparatus according to an embodiment of the invention.

In FIG. 1, a VOR field signal output from a VOR apparatus (not shown) and received by a monitor receiving antenna 11, and a self-check signal generated by a self-check signal generation circuit 14 are selectively supplied to first and second monitoring receiving circuits 15 and 16 via first and second switches 12 and 13, respectively. The monitor output results of the first and second monitoring receiving circuits 15 and 16 are supplied to a VOR monitor controller 18 via a monitoring receiving controller 17, where abnormality detection of the VOR apparatus is executed.

Figure 2:
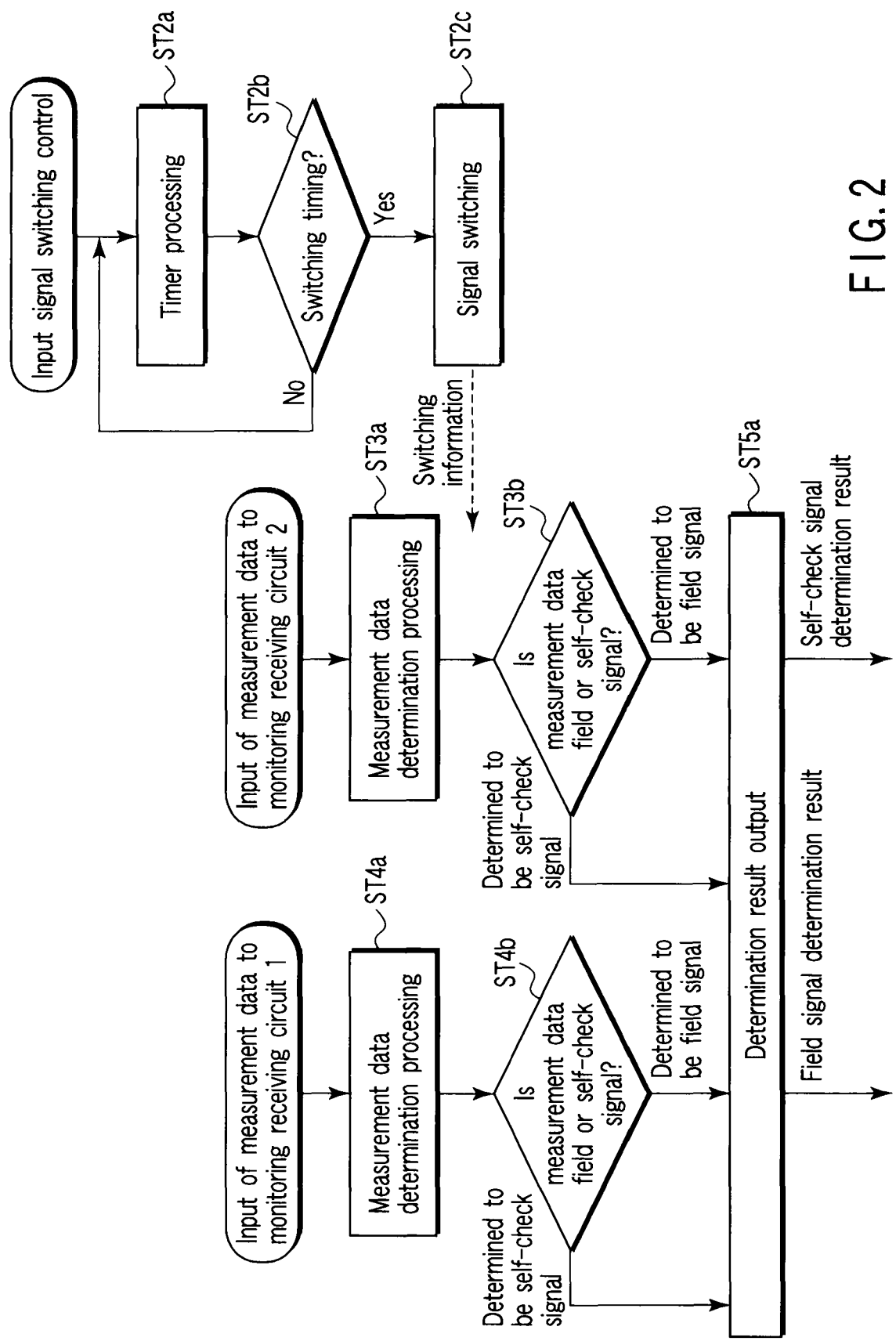
FIG. 2 is a flowchart illustrating the procedure of processes performed by the VOR monitoring receiving apparatus of the embodiment.

The operation of the above-mentioned structure will now be described. FIG. 2 is a flowchart illustrating the procedure of processes performed by the VOR monitoring receiving apparatus of the embodiment.

In the VOR monitoring receiving apparatus constructed as above, a VOR field signal is input to one of the first and second monitoring receiving circuits 15 and 16, thereby executing measurement data determination processing (steps ST3$a$ and ST4$a$). At the same time, the monitoring receiving controller 17 measures a preset time (step ST2$a$). If the preset time has elapsed, the process is shifted from step ST2$b$ to step ST2$c$, where the monitoring receiving controller 17 switches the signal input monitoring receiving circuit so that the monitoring receiving circuit to which a VOR field signal has been supplied so far will receive a self-check signal. As a result, the monitoring receiving circuits 15 and 16 can continue their monitoring receiving operations. The monitoring receiving controller 17 determines whether each of the outputs of the monitoring receiving circuits 15 and 16 is a field determination result or self-check result, and outputs the determination result to the VOR monitor controller 18 (step ST5$a$).

Referring then to FIG. 3, the above operation will be described in more detail. The monitoring receiving circuit 15 receives the signals shown in FIG. 3A. When the preset time has elapsed, the switches 12 and 13 switch the signals, input to the first and second monitoring receiving circuits 15 and 16, to the field signal and self-check signal, respectively, or vice versa.

The above operation is performed in units of preset times in accordance with a switch control signal output from the monitoring receiving controller 17. As a result, the monitoring receiving circuit 15 receives the signals shown in FIG. 3A, and the monitoring receiving circuit 16 receives the signals shown in FIG. 3C. Thus, the monitoring receiving circuits 15 and 16 can continue their monitoring receiving operations.

The monitoring receiving circuit 15 outputs the signals shown in FIG. 3B, and the monitoring receiving circuit 16 outputs the signals shown in FIG. 3D. These output signals are input to the VOR monitor controller 18.

The switching times of the switches 12 and 13 can be arbitrarily set by a user in the monitoring receiving controller 17.

As described above, in the embodiment, two monitoring receiving circuits 15 and 16 are employed, and the switches 12 and 13 are made to perform switching in units of preset times so that the switching timings of the field signal and self-check signal input to each monitoring receiving circuit do not overlap each other so as to continuously supply the field signal.

By virtue of this structure, the field signals can be monitored continuously while self-checking the monitoring receiving circuits 15 and 16, with the result that abnormality detection of the VOR device can be performed more reliably.

The present invention is not limited to the above-described embodiment, but may be modified in various ways without departing from the scope. Various inventions can be realized by appropriately combining the structural elements disclosed in the embodiments. For instance, some of the disclosed structural elements may be deleted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A VOR (Very High Frequency Omnidirectional Radio Range) monitoring receiving apparatus comprising:
    a receiving circuit configured to receive a field signal from a VOR apparatus, and output content of the field signal to a plurality of signal systems;
    a first monitoring receiving circuit provided in a first signal system included in the plurality of signal systems, and configured to monitor the content of the field signal;
    a second monitoring receiving circuit provided in a second signal system included in the plurality of signal systems, and configured to monitor the content of the field signal;
    a self-check signal generator configured to generate a self-check signal necessary to confirm whether the first and second monitoring receiving circuits normally operate;
    a VOR monitoring controller configured to detect an abnormality of the VOR apparatus based on monitoring results of the first and second monitoring receiving circuits;
    a switch configured to perform switching to alternately output the field signal and the self-check signal to the first and second signal systems; and
    a switch controller configured to receive a monitoring result from each of the first and second monitoring receiving circuits, determine whether a monitoring result from each of the first and second monitoring receiving circuits indicates monitored content of the field signal or monitored content of the self-check signal, output a determination result to the VOR monitoring controller, and control the switch to perform switching whenever a preset time elapses.

2. The VOR monitoring receiving apparatus according to claim 1, wherein the preset time can be arbitrarily set.

3. A VOR (Very High Frequency Omnidirectional Radio Range) monitoring receiving method for receiving a field signal from a VOR apparatus, monitoring content of the field signal using at least one signal system included in the plurality of signal systems, and inputting a monitoring result to a VOR monitoring controller to detect an abnormality of the VOR apparatus, comprising:
    generating a self-check signal necessary to confirm whether a first monitoring receiving circuit and a second monitoring receiving circuit normally operate, which are provided in a first signal system and a second signal system included in the plurality of signal systems, respectively;
    alternately outputting the field signal and the self-check signal to the first and second signal systems whenever a preset time elapses;
    causing the first and second monitoring receiving circuits to perform monitoring and output monitoring results to the VOR monitoring controller;
    determining whether the monitoring result from each of the first and second monitoring receiving circuits indicates monitored content of the field signal or monitored content of the self-check signal; and
    outputting a determination result to the VOR monitoring controller.

4. The VOR monitoring receiving method according to claim 3, wherein the preset time can be arbitrarily set.

* * * * *